United States Patent
Kushnir et al.

(10) Patent No.: US 12,124,320 B2
(45) Date of Patent: Oct. 22, 2024

(54) RUNTIME AGING COMPENSATION AND CALIBRATION

(71) Applicant: ATI Technologies ULC, Markham (CA)

(72) Inventors: Stephen Kushnir, Markham (CA); Mazhar Moshirvaziri, Fremont, CA (US)

(73) Assignee: ATI Technologies ULC, Markham (CA)

( * ) Notice: Subject to any disclaimer, the term of this patent is extended or adjusted under 35 U.S.C. 154(b) by 51 days.

(21) Appl. No.: 17/854,577

(22) Filed: Jun. 30, 2022

(65) Prior Publication Data
US 2024/0004455 A1    Jan. 4, 2024

(51) Int. Cl.
*G06F 1/3296* (2019.01)
*G06F 1/3228* (2019.01)

(52) U.S. Cl.
CPC .......... *G06F 1/3296* (2013.01); *G06F 1/3228* (2013.01)

(58) Field of Classification Search
CPC .................... G06F 1/3296; G06F 1/3228
See application file for complete search history.

(56) References Cited

U.S. PATENT DOCUMENTS

| | | | |
|---|---|---|---|
| 9,269,407 B1* | 2/2016 | Bickford | G11C 5/147 |
| 2008/0077348 A1* | 3/2008 | Hildebrand | G06F 1/32 |
| | | | 714/E11.154 |
| 2015/0081044 A1* | 3/2015 | Allen-Ware | G06F 11/008 |
| | | | 700/28 |
| 2016/0013654 A1* | 1/2016 | Saha | H02J 1/14 |
| | | | 307/29 |

\* cited by examiner

*Primary Examiner* — Terrell S Johnson
(74) *Attorney, Agent, or Firm* — Kowert, Hood, Munyon, Rankin & Goetzel, P.C.; Rory D. Rankin

(57) ABSTRACT

An apparatus and method for efficiently updating power supply voltages due to degradation from aging. A computing system includes one or more functional units and a runtime voltage calibrator (or calibrator). The calibrator is capable of performing power supply calibration for the one or more supply voltage power rail used by the one or more functional units. The calibrator identifies a particular ground reference power rail that is received by the one or more functional units. The calibrator also identifies a first supply voltage power rail that is received by at least a first functional unit of the one or more functional units. If the runtime voltage calibrator determines that all circuitry that uses the particular ground reference power rail is idle, the calibrator performs power supply calibration for the first supply voltage power rail. The calibrator does not wait for a bootup operation and avoids interference from ground bounce.

20 Claims, 5 Drawing Sheets

RUNTIME AGING COMPENSATION AND CALIBRATION

BACKGROUND

Description of the Relevant Art

Both planar transistors (devices) and non-planar transistors are fabricated for use in integrated circuits within semiconductor chips. A variety of choices exist for placing processing circuitry in system packaging to integrate the multiple types of integrated circuits. Some examples are a system-on-a-chip (SOC), multi-chip modules (MCMs) and a system-in-package (SiP). Mobile devices, desktop systems and servers use these packages. Regardless of the choice for system packaging, in several uses, both power consumption and voltage droop of modern integrated circuits have become an increasing design issue with each generation of semiconductor chips.

Advances in semiconductor fabrication techniques have been reducing transistor dimensions in order to increase both performance and functionality within the same amount of space. The supply voltages for the integrated circuits have been scaling down to reduce both power consumption and short channel effects. Superscalar designs increase the density of integrated circuits on a die with multiple pipelines, larger caches, and more complex logic. Therefore, the number of nodes and buses that switch per clock cycle on the die of the integrated circuit significantly increases. The simultaneous switching of wide buses, the parasitic capacitance and inductance on the die that increases transmission line effects, and the power supply currents flowing through non-zero resistance wires creating IR (current-resistance) voltage drops each contributes to data retention corruption, timing failures, and reduced performance on the die of the integrated circuit. In addition to these effects over time, changes in temperature and high operating temperature effects over time also contributes to performance degradation. The voltage effects, parasitic effects, and temperature effects contribute to the aging of the integrated circuits.

To account for the aging of integrated circuits, one-time static voltage guard bands can be added to the power supply voltages. However, these guard bands provide an upfront penalty by increasing power consumption. Sensors and monitors can be placed in integrated circuits to measure degradation effects of signals and routes. However, many measurements wait for a boot of the computing system. For computing systems that do not boot often, an appreciable amount of time elapses and the benefit provided by these measurements are reduced.

In view of the above, efficient methods and mechanisms for updating power supply voltages due to variations from aging are desired.

Figure 1:
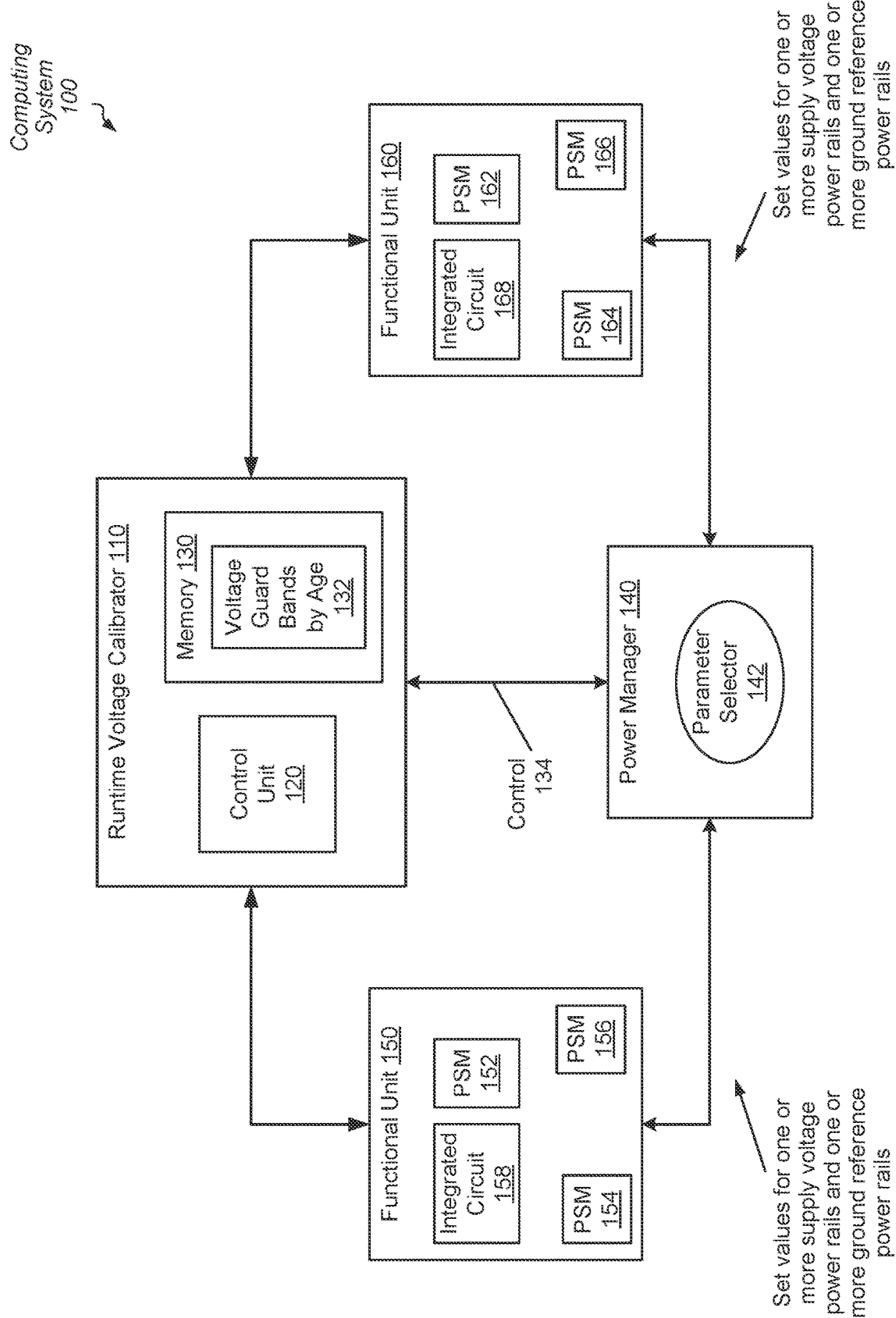
FIG. 1 is a generalized block diagram of a computing system that performs runtime updates of power supply voltages due to variations from aging.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods efficiently updating power supply voltages due to variations from aging are contemplated. In various implementations, a computing system includes one or more functional units and a runtime voltage calibrator. The hardware, such as circuitry, of the one or more functional units is capable of processing tasks such as threads of processes. It is possible for the operating power supply voltage of the functional units to vary from an expected value over time. In addition to IR (current-resistance) voltage droop and parasitic inductance voltage droop, aging of circuits contributes to data retention corruption and timing failures in critical paths of the functional units. One example of aging is negative bias temperature instability (NBTI). The hardware, such as circuitry, of the runtime voltage calibrator is capable of performing power supply calibration for the one or more supply voltage power rail used by the one or more functional units. As used herein, the term "unit" refers to a circuit or circuitry. Therefore, for example, a functional unit may be referred to as a function circuit or functional circuit.

When performing power supply calibration on a particular one of the supply voltage power rails, the runtime voltage calibrator determines values of voltage guard bands to add to the power supply voltages for the particular one of the supply voltage power rails. The voltage guard bands account for the aging of integrated circuits used by the one or more functional units. Rather than perform power supply calibration during a bootup operation of the computing system, the runtime voltage calibrator is capable of performing power supply calibration more frequently. For example, the computing system can be implemented in a server that does not boot often and weeks or months can elapse before a next bootup operation occurs.

The runtime voltage calibrator identifies a particular ground reference power rail that is received by the one or more functional units. The runtime voltage calibrator also identifies a first supply voltage power rail that is received by at least a first functional unit of the one or more functional units. In some implementations, the runtime voltage calibrator accesses a particular configuration register that stores values indicating this information, or the runtime voltage calibrator receives an indication from a power manager regarding which supply voltage power rails are used by circuitry of the one or more functional units that also use the particular ground reference power rail. If the runtime voltage calibrator determines that the one or more functional units have transitioned from an active state to an idle state, the runtime voltage calibrator performs power supply calibration for the first supply voltage power rail.

Although other functional units of the one or more functional units can use a second supply voltage power rail different from the first supply voltage power rail, the runtime voltage calibrator waits to perform power supply calibration for the first supply voltage power rail if any of those other functional units are active. The reason is due to possible interference of measurements of power supply voltages being placed on the first supply voltage power rail. This interference is sourced by ground bounce, which is a source of noise due to the sharing of the same particular ground reference power rail by two or more supply voltage power rails. This source of noise can lead to local variations in the ground reference level between two or more functional units. Therefore, it is not desirable for the runtime voltage calibrator to perform power supply calibration that includes measuring power supply voltages being placed on the first supply voltage power rail when ground bounce could be occurring.

When performing power supply calibration for the first supply voltage power rail, the runtime voltage calibrator determines whether any functional units sharing the particular ground reference power rail became active during calibration. In some implementations, the runtime voltage calibrator accesses a particular configuration register that stores values indicating this information, or the runtime voltage calibrator receives an indication from a power manager regarding the activity states of these one or more functional units. If at least one functional unit became active during calibration, then the runtime voltage calibrator the runtime voltage calibrator discards the updated power supply voltages for the first supply voltage power rail determined during calibration. Further details of efficiently updating power supply voltages due to variations from aging are provided in the following discussion.

Referring to FIG. 1, a generalized block diagram is shown of computing system 100 that performs runtime updates of power supply voltages due to variations from aging. As shown, the computing system 100 includes functional unit 150, functional unit 160, a runtime voltage calibrator 110, and a power manager 140. Each of the functional units 150 and 160 is representative of any circuitry with its own voltage and clock domain. Each of the functional units 150 and 160 conveys actual usage values to each of the runtime voltage calibrator 110 and the power manager 140. Examples of the actual usage values are operational parameters such as a clock frequency and a power supply voltage. The power supply monitors (PSMs) 152, 154 and 156 measure an operating voltage reference in a particular region of the functional unit 150. Similarly, power supply monitors (PSMs) 162, 164 and 166 measure an operating voltage reference in a particular region of the functional unit 160.

In an implementation, the runtime voltage calibrator 110 is a microcontroller that includes hardware, such as circuitry, for executing instructions of an algorithm that performs runtime power supply voltage calibration. In another implementation, the runtime voltage calibrator 110 is a particular processor core (or core) of a processor that executes the instructions of the algorithm that performs runtime power supply voltage calibration. In yet other implementations, the runtime voltage calibrator 110 is an application specific integrated circuit (ASIC) that executes the instructions of the algorithm that performs runtime power supply voltage calibration. Each of the functional units 150 and 160 is representative of any processing unit capable of performing tasks corresponding to processing software applications, handling input/output (I/O) requests, and other tasks of the computing system 100. Examples of the functional units 150 and 160 are a general-purpose central processing unit (CPU), a field programmable gate arrays (FPGA), an application specific integrated circuit (ASIC), a parallel data processor such as a processor with a single instruction multiple data (SIMD) microarchitecture or a digital signal processor (DSP), and so forth.

Each of the power supply monitors 152-156 and 162-166 measures an operating voltage reference in a particular region of a corresponding one of the functional units 150 and 160. As used herein, the "operating voltage reference" is also referred to as the "power supply voltage." The power supply voltage (operating voltage reference) is applied to a corresponding supply voltage power rail. In one example, the regions include a processor core of multiple processor cores and controllers and interfaces of the functional units 150 and 160. The regions also include areas of the semiconductor die of the functional units 150 and 160 that include one of a variety of integrated circuits such as the integrated circuit 158 and 168. Examples of the integrated circuits 158 and 168 are a processor core (or core) of multiple processor cores, a memory controller, an interface unit, an arithmetic logic unit and so forth. Other regions, such as within a memory controller, an interface unit, or other, are possible and contemplated for placement of the power supply monitors 152-156 and 162-166. Although three power supply monitors are shown in the functional units 150 and 160, in other implementations, another number of power supply monitors are used.

Each of the power supply monitors 152-156 and 162-166 measures an average operating voltage reference over a particular time period. For example, a power supply monitor of the power supply monitors 152-156 and 162-166 receives the operating voltage reference from a corresponding supply voltage power rail after power supply voltage generating circuitry generated the operating voltage reference on the corresponding supply voltage power rail. The power supply monitor generates an indication of a count corresponding to the measured operating voltage reference. A mapping exists that relates the count determined over the particular time period to values of operating voltage references. In various implementations, the power supply monitor is implemented as a time-to-digital converter (TDC).

The control unit/circuit 120 of the runtime voltage calibrator 110 relies on information stored in the memory 130. For example, the memory 130 stores information 132 that includes voltage guard bands by age. In some implementations, this information is stored in one or more lookup tables implemented in the memory 130, and this information is used to update operating voltage references of the functional units 150 and 160. The control unit 120 sends an indication, via the feedback information 134, to the power manager 140 specifying the operating voltage references to use for the functional units 150 and 160.

Although it is shown that the parameter selector 142 determines the operational parameters of the functional unit 150, in other implementations, other units receive the operational parameters, and determine values for the operational parameters to provide to the functional units 150 and 160. In yet other implementations, the runtime voltage calibrator 110 sends feedback information 134 directly to these other units, rather than to the power manager 140. These values of the operational parameters are used by the functional units 150 and 160 until a next event occurs that causes the value to be updated. Examples of these events are one or more of an update of the feedback information 134, an update of a power-performance state (P-state), a detection that a particular amount of time has elapsed, and so forth. One example of these other units is an on-die voltage regulator unit used to generate the power supply voltage by modulating a resistance such that the operational voltage reference being output from a voltage rail is maintained at a determined voltage. It is possible for the operating power supply voltage of the functional units 150 and 160 to vary from an expected value over time. In addition to IR (current-resistance) voltage droop and parasitic inductance voltage droop, aging of circuits contributes to data retention corruption and timing failures in critical paths of the functional units 150 and 160. One example of aging is negative bias temperature instability (NBTI).

The control unit 120 of the runtime voltage calibrator 110 identifies a particular ground reference power rail that is received by one or more functional units of the functional units 150 and 160. The control unit 120 also identifies one or more supply voltage power rails that are received by the one or more functional units of the functional units 150 and 160 that share the particular ground reference power rail. In some implementations, the control unit 120 accesses a particular configuration register that stores values indicating this information, or the control unit 120 receives an indication from the power manager 140 regarding which supply voltage power rails are used by which circuitry of the functional units 150 and 160 that also use the particular ground reference power rail. If the control unit 120 determines that each of the one or more functional units of the functional units 150 and 160 that share the particular ground reference power rail have transitioned from an active state to an idle state, then the control unit 120 is able to perform power supply calibration for a first supply voltage power rail of the one or more supply voltage power rails used by the functional units 150 and 160. When the control unit 120 of the runtime voltage calibrator 110 determines that it is able to perform power supply calibration for the first supply voltage power rail, the control unit 120 sends a notification with a request to measure an operating voltage reference of one or more functional units of the functional units 150 and 160 that receive the first supply voltage power rail.

Although other circuitry of the functional units 150 and 160 can use a second supply voltage power rail different from the first supply voltage power rail, the control unit 120 waits to perform power supply calibration for the first supply voltage power rail if any circuitry that uses the particular ground reference power rail is active. The reason is due to possible interference of measurements of power supply voltages being placed on the first supply voltage power rail. This interference is caused by ground bounce. During the power supply calibration, a measurement of the operating voltage reference is performed (e.g., by one of the power supply monitors 152-156 and 162-166). When the control unit 120 receives a measured operating voltage reference, the control unit 120 determines a voltage difference between a desired operating voltage reference and the measured operating voltage reference. In some implementations, the functional units 150 and 160 use power supply monitors that include a combination of one or more Boolean logic gates and a ring oscillator that sends an output to time to digital conversion (TDC) circuitry. The TDC circuitry provides a digital code that represents a measured value of the operating voltage reference. In an implementation, the desired operating voltage reference is a value of an operating voltage reference indicated by a digital code obtained during an initial calibration of the functional units 150 and 160 before being subjected to aging effects.

The control unit 120 uses the voltage difference to select one of the voltage guard bands from the information 132. The control unit 120 reads out a voltage adjustment indicated by the selected voltage guard band, and sends an indication, via the feedback information 134, to the power manager 140 specifying how to update the desired operating voltage reference with the voltage adjustment. The parameter selector 142, within the power manager 140, uses the feedback information 134 to select operational parameters for particular supply voltage power rails used by the functional units 150 and 160.

A variety of choices exist for placing the circuitry of the computing system 100 in system packaging to integrate the multiple types of integrated circuits. Some examples are a system-on-a-chip (SOC), multi-chip modules (MCMs) and a system-in-package (SiP). Mobile devices, desktop systems and servers use these packages and the functionality of the computing system 100. Clock sources, such as phase lock loops (PLLs), interrupt controllers, power controllers, memory controllers, interfaces for input/output (I/O) devices, and so forth are not shown in FIG. 1 for ease of illustration. It is also noted that the number of components of the computing system 100 and the number of subcomponents for those shown in FIG. 1, such as within the functional unit 150, the runtime voltage calibrator 110, and the power manager 140, can vary from implementation to implementation. There can be more or fewer of each component/subcomponent than the number shown for the computing system 100. In some implementations, the runtime voltage calibrator 110 is used for a particular voltage and clock domain. In other implementations, a runtime voltage calibrator 110 is used for multiple voltage and clock domains.

Figure 2:
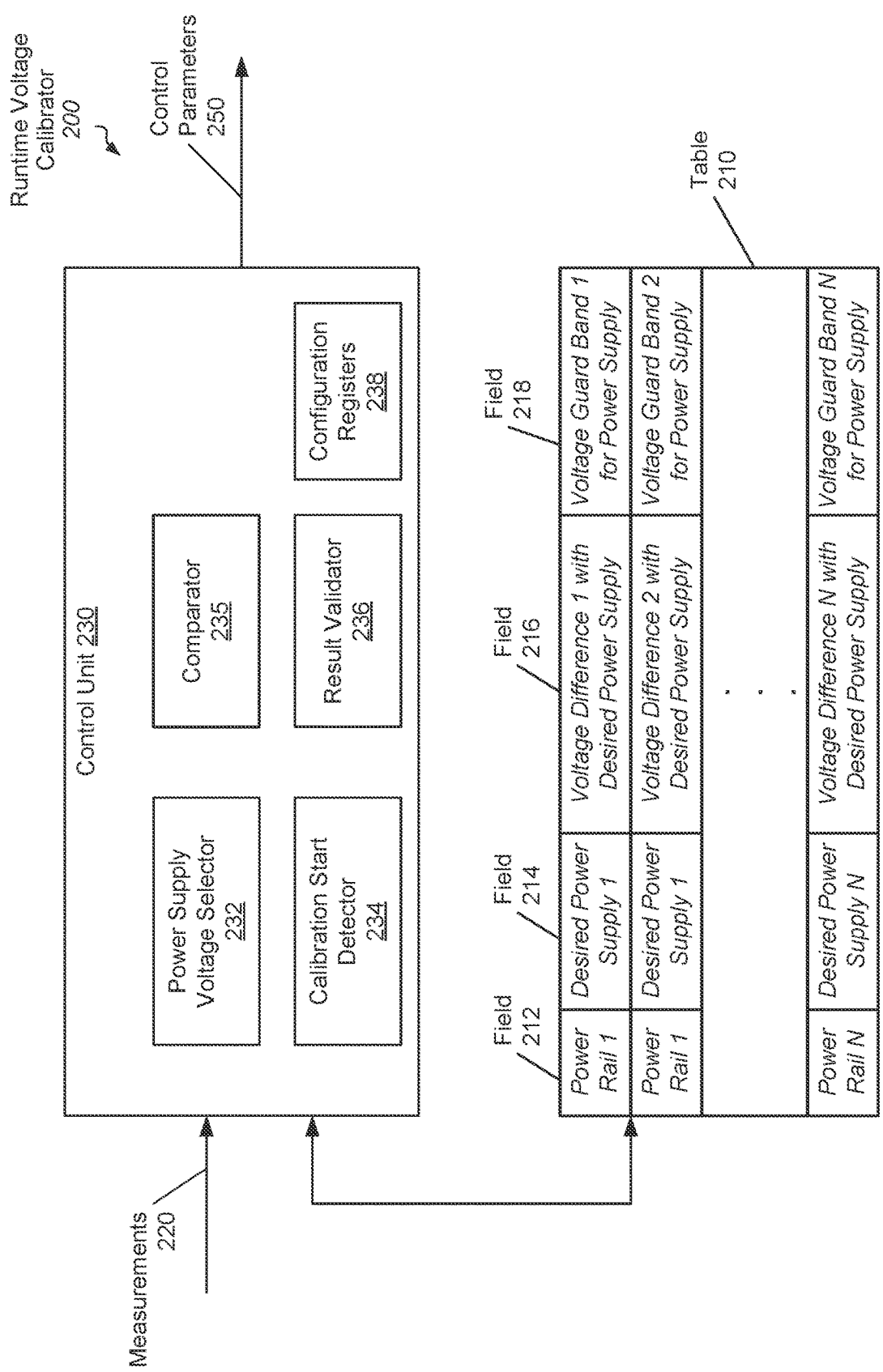
FIG. 2 is a generalized block diagram of a runtime voltage calibrator that performs runtime updates of power supply voltages due to variations from aging.

Referring to FIG. 2, a generalized block diagram is shown of a runtime voltage calibrator 200 that performs runtime updates of power supply voltages due to variations from aging. As shown, the runtime voltage calibrator 200 includes the table 210 and the control unit 230. The control unit 230 includes multiple components 232-238 that are used to generate the operating parameters 250 that includes a voltage adjustment indicated by the selected voltage guard band to be added to a particular power supply voltages for a particular supply voltage power rail. The table 210 includes multiple table entries (or entries), each storing information in multiple fields such as at least fields 212-218.

The table 210 is implemented with one of flip-flop circuits, a random access memory (RAM), a content addressable memory (CAM), or other. Although particular information is shown as being stored in the fields 212-218 and in a particular contiguous order, in other implementations, a different order is used and a different number and type of information is stored. As shown, field 212 stores a partition identifier (ID) that specifies a particular supply voltage power rail. The field 214 stores a desired operating voltage reference (desired power supply voltage). The field 216 stores a voltage difference between a desired operating voltage reference and the measured operating voltage reference. The field 218 stores a voltage guard band that is a voltage offset (voltage adjustment) to add to a particular power supply voltage for a particular supply voltage power rail.

The control unit 230 receives usage measurements 220, which represent at least a measurement of a power supply voltage being placed on a particular supply voltage power rail. The comparator 235 determines a voltage difference between a desired operating voltage reference and the measured operating voltage reference. The control unit 230 accesses the table 210 with the determined voltage difference and sends the selected voltage guard band to a power manager as the control parameters 250. The calibration start detector 234 (or detector 234) determines when all functional units sharing a particular ground reference power rail are idle. In some implementations, the detector 234 receives an indication from an external power manager. Although other functional units can use another supply voltage power rail different from a particular supply voltage power rail to be calibrated, the detector 234 waits to perform power supply calibration for the particular supply voltage power rail if any of those other functional units are active when the other supply voltage power rails are used by circuitry along with the particular ground reference power rail. The reason is due to possible ground bounce interference.

When the detector 234 determines that power supply calibration can begin for the particular supply voltage power rail, the power supply voltage selector 232 (or selector 232) selects which desired operating voltage reference to use at a particular point in time of the calibration. The selector 232 can select one or more of multiple desired operating voltage references during the duration of the power supply calibration. The result validator 236 determines whether to discard or maintain the results of the power supply calibration upon completion. If any circuitry of functional units using the particular ground reference power rail became active during the power supply calibration, then the result validator 236 discards the updated power supply voltages (voltage guard bands) determined during calibration for the particular supply voltage power rail. In an implementation, one or more components of the runtime voltage calibrator 200 uses the particular ground reference power rail. However, the result validator 236 does not include these one or more components as circuitry of functional units when determining whether to maintain or discard the updated power supply voltages (voltage guard bands).

One or more components of the runtime voltage calibrator 200 use values stored in the configuration registers 238 during power supply calibration. In some implementations, the selector 232 selects from a list of desired operating voltage references stored in the configuration registers 238. In an implementation, the external power manager stores an indication (or indications) in one or more particular configuration registers of the configuration registers 238 that specifies whether functional units sharing a particular ground reference power rail are idle. Each of the detector 234 and the result validator 236 checks these one or more particular configuration registers. The detector 234 checks these one or more particular configuration registers in order to determine whether to begin power supply calibration for the particular supply voltage power rail. The result validator 236 checks these one or more particular configuration registers to determine whether to discard or maintain the results of the power supply calibration upon completion.

Figure 3:
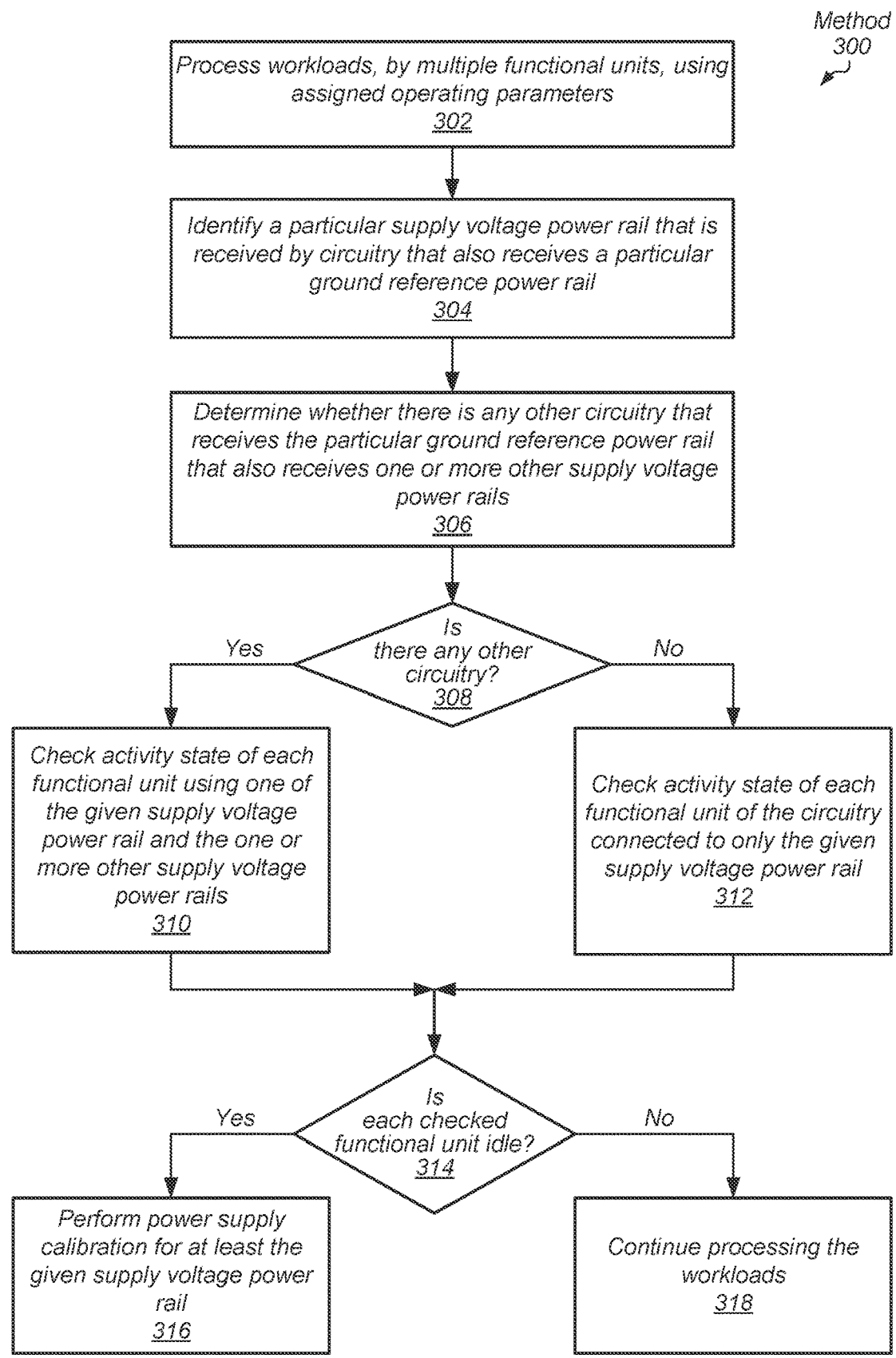
FIG. 3 is a generalized block diagram of a method for performing runtime updates of power supply voltages due to variations from aging.

Referring to FIG. 3, a generalized block diagram is shown of a method 300 for performing runtime updates of power supply voltages due to variations from aging. For purposes of discussion, the steps in this implementation (as well as in FIGS. 4-5) are shown in sequential order. However, in other implementations some steps occur in a different order than shown, some steps are performed concurrently, some steps are combined with other steps, and some steps are absent.

Multiple functional units, using assigned operating parameters, process workloads (block 302). A runtime voltage calibrator communicates with the multiple functional units. In some implementations, the multiple functional units are processing units or one of a variety of other types of integrated circuits in a system-on-a-chip (SOC), a multi-chip modules (MCM), or a system-in-package (SiP). In an implementation, the runtime voltage calibrator is a microcontroller that includes hardware, such as circuitry, for executing instructions of an algorithm that performs runtime power supply voltage calibration. Rather than wait for a bootup operation, the runtime voltage calibrator performs the steps of runtime power supply voltage calibration either when the runtime voltage calibrator detects the multiple functional units are idle or the runtime voltage calibrator determines a particular time interval has elapsed.

The circuitry of the runtime voltage calibrator identifies a particular supply voltage power rail that is received by circuitry that also receives a particular ground reference power rail (block 304). For example, circuitry of the two functional units receive a first supply voltage power rail. Circuitry of these two functional units also receive a first ground reference power rail. In this case, the first supply voltage power rail is the particular supply voltage power rail. Other circuitry can receive a second ground reference power rail that is different from the first ground reference power rail, but any supply voltage power rails used by this other circuitry are not the identified particular supply voltage power rail (the first supply voltage power rail in this example).

The runtime voltage calibrator determines whether there is any other circuitry that receives the particular ground reference power rail that also receives one or more other supply voltage power rails (block 306). This information can be stored in one or more particular configuration registers that identify the functional units that use the particular ground reference power rail. If the runtime voltage calibrator determines that there is other circuitry, such as other functional units, that also receives one or more other supply voltage power rails ("yes" branch of the conditional block 308), then the runtime voltage calibrator checks the activity state of each functional unit using one of the given supply voltage power rail and the one or more other supply voltage power rails (block 310). A power manager can provide this information.

If the runtime voltage calibrator determines that there is no other circuitry, such as other functional units, that also receives one or more other supply voltage power rails ("no" branch of the conditional block 308), then the runtime voltage calibrator checks the activity state of each functional unit of the circuitry connected to only the given supply voltage power rail (block 312). If the runtime voltage calibrator determines that each checked functional unit is idle ("yes" branch of the conditional block 314), then the runtime voltage calibrator performs power supply calibration for at least the given supply voltage power rail (block 316). Otherwise, if the runtime voltage calibrator determines that each checked functional unit is idle ("no" branch of the conditional block 314), then the runtime voltage calibrator waits to perform power supply calibration while the functional units continue processing the workloads (block 318).

Figure 4:
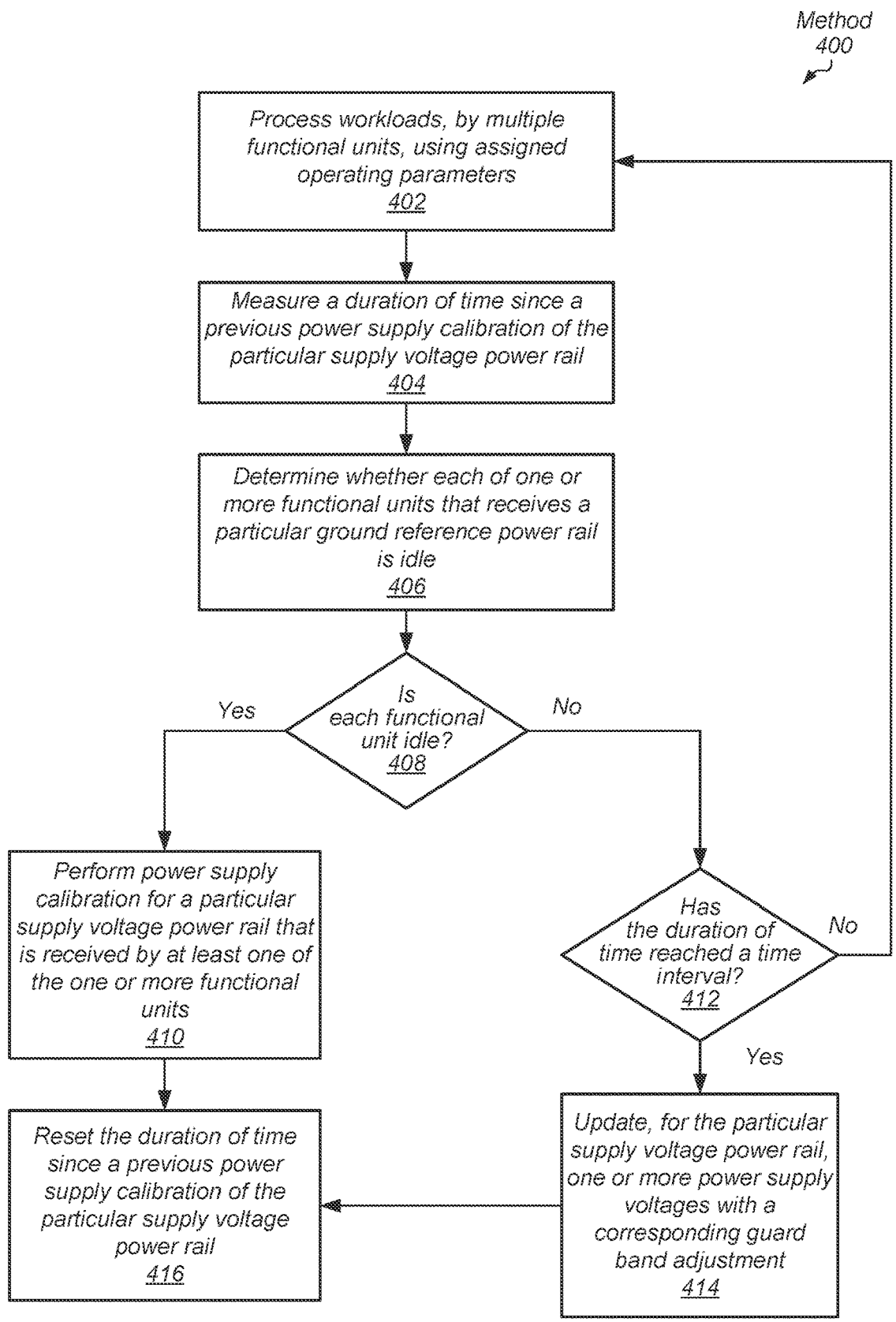
FIG. 4 is a generalized block diagram of a method for performing runtime updates of power supply voltages due to variations from aging.

Turning now to FIG. 4, a generalized block diagram is shown of a method 400 for performing runtime updates of power supply voltages due to variations from aging. Multiple functional units, using assigned operating parameters, process workloads (block 402). A runtime voltage calibrator communicates with the multiple functional units. The runtime voltage calibrator measures a duration of time since a previous power supply calibration of the particular supply voltage power rail (block 404). In various implementations, the runtime voltage calibrator includes a counter that measures the duration of time since a previous power supply calibration of the particular supply voltage power rail. The counter is capable of counting up from zero to a value indicating a particular time interval. Alternatively, the counter is capable of counting down to zero from the value indicating the particular time interval. The runtime voltage calibrator determines whether each of one or more functional units that receives a particular ground reference power rail is idle (block 406). In some implementations, the runtime voltage calibrator accesses a particular configuration register that stores values indicating this information, or the runtime voltage calibrator receives an indication from a power manager regarding the activity states of these one or more functional units.

If the runtime voltage calibrator determines that each checked functional unit is idle ("yes" branch of the conditional block 408), then the runtime voltage calibrator performs power supply calibration for a particular supply voltage power rail that is received by at least one of the one or more functional units (block 410). Afterward, the runtime voltage calibrator resets a measurement of a duration of time since a previous power supply calibration of the particular supply voltage power rail (block 416). However, in some implementations, the runtime voltage calibrator conditionally resets the measurement of the duration of time based on determining whether the performed power supply calibration for the particular supply voltage power rail is valid. These steps of determining validity of the power supply calibration are further described in the description of method 500 (of FIG. 5). If the runtime voltage calibrator determines to discard the updated power supply voltages for the supply voltage power rail determined during calibration, then the runtime voltage calibrator does not yet reset the measurement of the duration of time.

In various implementations, the runtime voltage calibrator accesses the counter used to measure the duration of time, and the runtime voltage calibrator compares the value obtained from the counter to a value indicating the particular time interval. If the runtime voltage calibrator determines that any checked functional unit is not idle ("no" branch of the conditional block 408), and if the runtime voltage calibrator determines that the duration of time has reached a time interval ("yes" branch of the conditional block 412), then the runtime voltage calibrator updates, for the particular supply voltage power rail, one or more power supply voltages with a corresponding guard band adjustment (block 414).

In various implementations, the guard band adjustment that is used is based on a model of the expected worst case voltage degradation over time. In some implementations, the guard band adjustment voltages to add to the particular supply voltage power rail are stored in a data storage area such as a table or otherwise. The runtime voltage calibrator accesses this data storage area with an overall age reported by the one or more functional units using the particular supply voltage power rail, and obtains the corresponding guard band adjustment voltage. Afterward, control flow of method 400 moves to block 416 where the runtime voltage calibrator resets the measurement of the duration of time since a previous power supply calibration of the particular supply voltage power rail. If the runtime voltage calibrator determines that any checked functional unit is not idle ("no" branch of the conditional block 408), and if the runtime voltage calibrator determines that the duration of time has not yet reached the time interval ("no" branch of the conditional block 412), then control flow of method 400 returns to block 402 where the runtime voltage calibrator waits to update one or more power supply voltages while the functional units continue processing the workloads.

Figure 5:
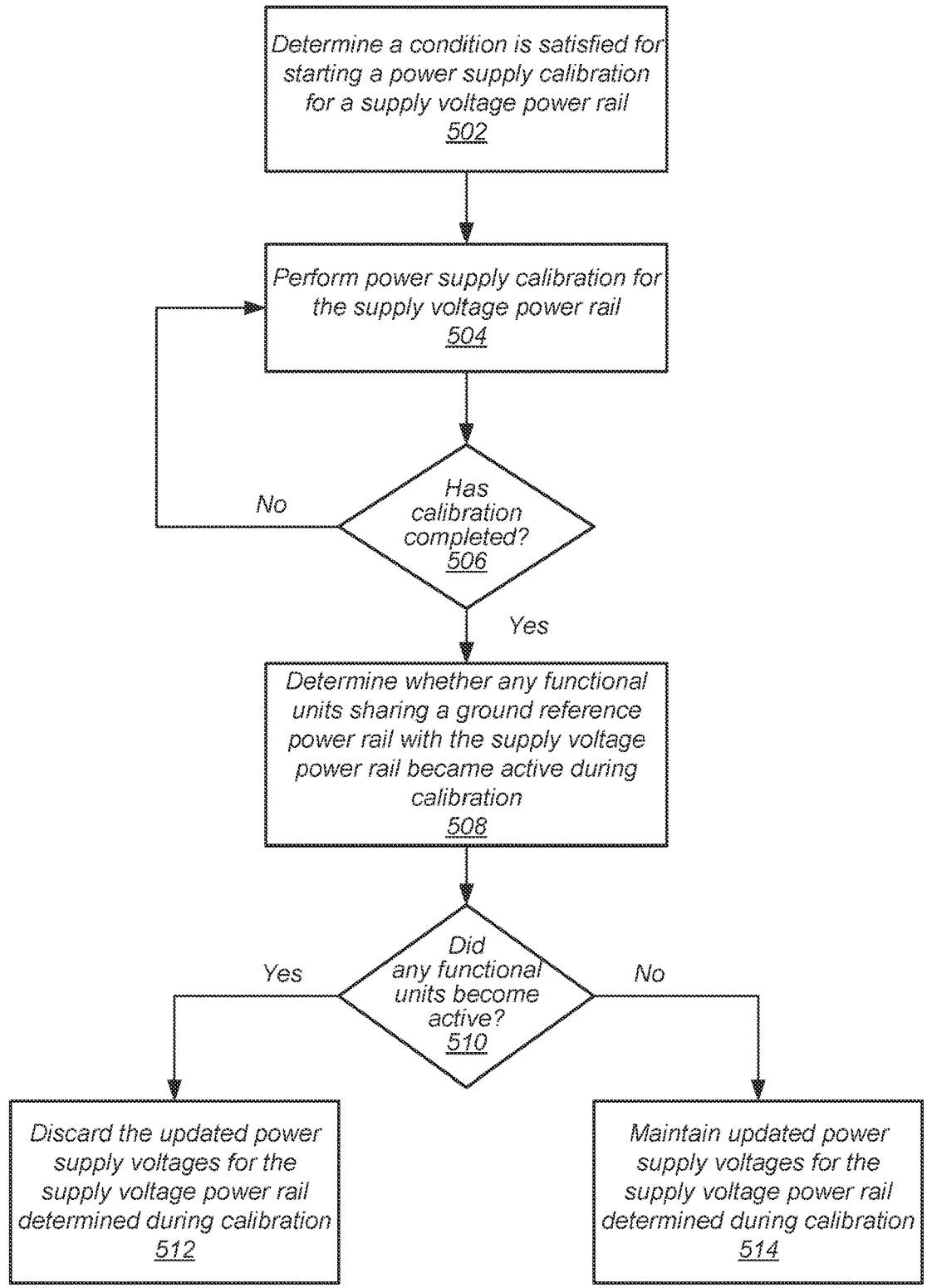
FIG. 5 is a generalized block diagram of a method for performing runtime updates of power supply voltages due to variations from aging.

Referring to FIG. 5, a generalized block diagram is shown of a method 500 for performing runtime updates of power supply voltages due to variations from aging. Multiple functional units, using assigned operating parameters, process workloads, and a runtime voltage calibrator communicates with the multiple functional units. The runtime voltage calibrator determines a condition is satisfied for starting a power supply calibration for a supply voltage power rail (block 502). For example, the power supply calibration has determined each corresponding functional unit is idle or a particular time interval has elapsed as described earlier in methods 300-400 (of FIGS. 3-4). Accordingly, the runtime voltage calibrator performs power supply calibration for the supply voltage power rail (block 504).

If the runtime voltage calibrator has determined that the power supply calibration has not yet completed ("no" branch of the conditional block 506), then control flow of method 500 returns to block 504 where the runtime voltage calibrator performs power supply calibration for the supply voltage power rail. If the runtime voltage calibrator has determined that the power supply calibration has completed ("yes" branch of the conditional block 506), then runtime voltage calibrator determines whether any functional units sharing a ground reference power rail with the supply voltage power rail became active during calibration (block 508). In some implementations, the runtime voltage calibrator accesses a particular configuration register that stores values indicating this information, or the runtime voltage calibrator receives an indication from a power manager regarding the activity states of these one or more functional units.

If the runtime voltage calibrator determines at least one functional unit sharing the ground reference power rail with the supply voltage power rail became active during calibration ("yes" branch of the conditional block 510), then the runtime voltage calibrator discards the updated power supply voltages for the supply voltage power rail determined during calibration (block 512). However, if the runtime voltage calibrator determines no functional unit sharing the ground reference power rail with the supply voltage power rail became active during calibration ("no" branch of the conditional block 510), then the runtime voltage calibrator maintains the updated power supply voltages for the supply voltage power rail determined during calibration (block 514).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
control circuitry configured to:
  receive an indication of a ground reference power rail that is received by one or more functional circuits;
  receive a partition identifier specifying a first supply voltage power rail different from the ground reference power rail that is received by at least a first functional unit of the one or more functional circuits; and
  in response to each of the one or more functional circuits having transitioned to an idle state, perform power supply calibration for the first supply voltage power rail.

2. The apparatus as recited in claim 1, wherein the apparatus further comprises a data storage area configured to store mappings between voltage differences and voltage guard band values, wherein the voltage differences are between a desired operating voltage reference and a measured operating voltage reference.

3. The apparatus as recited in claim 1, wherein the control circuitry is further configured to generate an indication that at least one functional circuit of the one or more functional circuits transitioned from the idle state to an active state prior to completion of the power supply calibration.

4. The apparatus as recited in claim 3, wherein in response to the at least one functional circuit had transitioned from the idle state to the active state, the control circuitry is further configured to discard updated power supply voltages for the first supply voltage power rail generated during the power supply calibration for the first supply voltage power rail.

5. The apparatus as recited in claim 3, wherein the control circuitry is further configured to maintain updated power supply voltages for the first supply voltage power rail generated during the power supply calibration for the first supply voltage power rail, in response to no functional circuit of the one or more functional circuits transitioned from the idle state to the active state prior to completion of the power supply calibration.

6. The apparatus as recited in claim 1, wherein the control circuitry is further configured to:
  identify a second supply voltage power rail that is received by at least a second functional circuit of the one or more functional circuits; and
  in response to at least one functional circuit of the one or more functional circuits has not transitioned from an active state to the idle state, measure a duration of time since a previous power supply calibration of the second supply voltage power rail.

7. The apparatus as recited in claim 6, wherein, in response to the duration of time has reached a time interval, the control circuitry is further configured to update, for the second supply voltage power rail, one or more power supply voltages with a corresponding guard band voltage value.

8. A method, comprising:
  processing tasks by one or more functional circuits; and
  receiving, by a runtime voltage calibrator, an indication of a ground reference power rail that is received by the one or more functional circuits;
  receiving, by the runtime voltage calibrator, a partition identifier specifying a first supply voltage power rail different from the ground reference power rail that is received by at least a first functional unit of the one or more functional circuits; and
  in response to each of one or more functional circuits having transitioned to an idle state, performing, by the runtime voltage calibrator, power supply calibration for the first supply voltage power rail.

9. The method as recited in claim 8, further comprising storing, by the runtime voltage calibrator, mappings between voltage differences and voltage guard band values, wherein the voltage differences are between a desired operating voltage reference and a measured operating voltage reference.

10. The method as recited in claim 8, further comprising generating, by the runtime voltage calibrator, an indication specifying at least one functional circuit of the one or more functional circuits transitioned from the idle state to an active state prior to completion of the power supply calibration.

11. The method as recited in claim 10, wherein in response to at least one functional circuit had transitioned from the idle state to an active state, the method further comprises discarding, by the runtime voltage calibrator, updated power supply voltages for the first supply voltage power rail generated during the power supply calibration for the first supply voltage power rail.

12. The method as recited in claim 10, further comprising maintaining, by the runtime voltage calibrator, updated power supply voltages for the first supply voltage power rail generated during the power supply calibration for the first supply voltage power rail, in response to no functional circuit of the one or more functional circuits transitioned from the idle state to the active state prior to completion of the power supply calibration.

13. The method as recited in claim 8, further comprising:
identifying, by the runtime voltage calibrator, a second supply voltage power rail that is received by at least a second functional circuit of the one or more functional circuits and
in response to at least one functional circuit of the one or more functional circuits has not transitioned from an active state to the idle state, measuring, by the runtime voltage calibrator, a duration of time since a previous power supply calibration of the second supply voltage power rail.

14. The method as recited in claim 13, wherein, in response to the duration of time has reached a time interval, the method further comprises updating, by the runtime voltage calibrator for the second supply voltage power rail, one or more power supply voltages with a corresponding guard band voltage value.

15. A computing system comprising:
one or more functional circuits configured to process tasks;
a runtime voltage calibrator configured to:
receive an indication of a ground reference power rail that is received by the one or more functional circuits;
receive a partition identifier specifying a first supply voltage power rail different from the ground reference power rail that is received by at least a first functional unit of the one or more functional units; and
in response to each of the one or more functional circuits having transitioned to an idle state, perform power supply calibration for the first supply voltage power rail.

16. The computing system as recited in claim 15, wherein the runtime voltage calibrator is further configured to generate an indication specifying at least one functional circuit of the one or more functional circuits transitioned from the idle state to an active state prior to completion of the power supply calibration.

17. The computing system as recited in claim 16, wherein in response to at least one functional circuit had transitioned from an idle state to the active state, the runtime voltage calibrator is further configured to discard updated power supply voltages for the first supply voltage power rail generated during the power supply calibration for the first supply voltage power rail.

18. The computing system as recited in claim 16, wherein the runtime voltage calibrator is further configured to maintain updated power supply voltages for the first supply voltage power rail generated during the power supply calibration for the first supply voltage power rail, in response to no functional circuit of the one or more functional circuits transitioned from the idle state to an active state prior to completion of the power supply calibration.

19. The computing system as recited in claim 15, wherein the runtime voltage calibrator is further configured to:
identify a second supply voltage power rail that is received by at least a second functional circuit of the one or more functional circuits; and
in response to at least one functional circuit of the one or more functional circuits has not transitioned from an active state to the idle state, measure a duration of time since a previous power supply calibration of the second supply voltage power rail.

20. The computing system as recited in claim 19, wherein, in response to the duration of time has reached a time interval, the runtime voltage calibrator is further configured to update, for the second supply voltage power rail, one or more power supply voltages with a corresponding guard band voltage value.

* * * * *